3,311,592
PROCESS FOR THE PRODUCTION OF HIGH MO-
LECULAR WEIGHT POLYOXYMETHYLENES
Kuno Wagner and Ernst-Ulrich Köcher, Leverkusen,
Germany, assignors to Farbenfabriken Bayer Aktien-
gesellschaft, Leverkusen, Germany, a German corpora-
tion
No Drawing. Filed Sept. 25, 1963, Ser. No. 311,329
Claims priority, application Germany, Oct. 13, 1962,
F 38,029
4 Claims. (Cl. 260—67)

The invention relates to a process for the production of high molecular weight polyoxymethylenes by the polymerization of formaldehyde, compounds of divalent tin being used as catalysts.

It is known that practically anhydrous, highly purified formaldehyde having a water content of less than 0.05% can be polymerized with the aid of numerous catalysts such as boron trifluoride, oxonium salts, tertiary and quaternary nitrogen bases, metal salts, metal alcoholates, organometallic compounds, sulphonium salts, phosphonium salts, etc., in inert solvents to produce high molecular weight polyoxymethylenes. It is further known that formaldehyde gases having a relatively high water content can be polymerized to high molecular weight polyoxymethylenes with the aid of special catalysts. In this case, impure formaldehyde having a water content of about 0.5 to 5% is introduced into an organic solvent or into a solvent having an acylating or an alkylating action or it is passed over high molecular weight polyoxymethylene in the absence of solvents, and special catalysts, preferably compounds of divalent tin, are added to the polymerization mixture. With this method, the chain breaking reagent due to water and other impurities may be slowed down considerably so that high quality polyoxymethylenes having internal viscosities of about 0.6 to 3 (measured in dimethylformamide or butyrolactone at 150° C. in 0.5% solution) corresponding to average molecular weights of about 30,000 to 150,000, may be obtained.

Among the various divalent tin compounds it is mainly the divalent tin salts of organic carboxylic acids as well as freshly prepared, colloidal dissolved divalent tin hydroxides which have hitherto been of practical importance in the polymerization of formaldehyde. With numerous other divalent tin compounds, both inorganic and organic, it has not been possible to confirm the exceptional properties of the divalent tin radical as initiator in the polymerization of formaldehyde, so that one had to assume that the anion of the catalyst, i.e. mainly the acyl radicals of organic carboxylic acids, are of decisive importance in the polymerization processes (chain starting, chain breaking, transfer reactions) of the polymerization reaction which is disturbed relatively little by water. Although these catalysts, which may be prepared, for example from divalent tin chloride and which could hitherto not be used, are highly active polymerization catalysts for highly purified formaldehyde, they have only been able to produce polyoxymethylenes similar to paraformaldehyde when used as catalysts for the polymerization of formaldehyde vapours which contain water.

It has been found that the reason why numerous divalent tin compounds cannot be used in the process of the cited prior patents is that when divalent tin compounds are prepared from divalent tin chloride they usually contain small quantiites of dissociable halogen compounds as well as portions of soluble alkali salts and more or less large quantities of tetravalent tin compounds. The increased proportion of tetravalent tin compounds is due to the fact that the liability of divalent tin to oxidise has hitherto not been sufficiently taken into account in the preparation of catalysts. The first two impurities mentioned will seriously impair the polymerization process even when present only in quantities of a few milligrams per litre of polymerization medium, and the third component, namely the tetravalent tin compounds, also seriously reduces the catalytic effect of the catalyst if present in proportions of more than 10% calculated on the divalent tin. The chain breaking reactions released by the said impurities have the effect that the good property of the divalent tin catalysts of rapidly encouraging polymerization when the chain breaking reactions are relatively strongly retarded, is completely masked by the influence of the impurities.

The object of this invention is the production of high molecular weight polyoxymethylenes by the polymerization of formaldehyde which contains impurities, divalent tin compounds of the formula

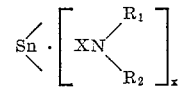

being used as catalysts, in which R represents an organic carboxylic acid radical, a dithiocarbaminic acid radical, the hydroxyl group, a mercapto group, the cyanide group, the thiocyanate group and the cyanate group, X is a hydrogen or a methylene oxyalkly group $R_1$ is an alkyl-, aryl- and methyleneoxyalkyl group, $R_2$ is an alkyl group, an aryl group and a carbamide or thiocarbamide group, or $R_1$ and $R_2$ together are members of a hydrocarbon ring, and X is a whole number from 1–10.

To carry out the process, gaseous formaldehyde containing impurities, for example 0.5–3% water, may be polymerized in inert solvents, in acylating agents or alkylating agents or in the gaseous phase over large surfaces, e.g., over polyoxymethylenes at normal pressure, elevated pressure or pressures below 760 mm. Hg if desired with the use of inert gases such as nitrogen or inert vapours of organic liquids such as toluene, in the presence of catalytic quantities of the said divalent tin compounds.

Examples of such catalysts are complexes with diphenylamine, urea monomethylol-butyl ether or caprolactam-monomethylol-butyl ether. These complexes are easily soluble in inert organic solvents.

It is advisable to use the complex-forming compounds in quantities of about 1 to 5 mols per 1 mol of the corresponding tin compound. Furthermore, these complex-forming compounds have the ability to exert a chain controlling effect during polymerization, so that if necessary it is possible to reduce the average molecular weight of the polyoxymethylenes, with the result that products which are more easily worked up can be obtained. The said complex-forming compounds furthermore make it possible to remove the catalysts fairly completely from the polymers, thereby increasing the thermostability of the polymers.

With the aid of these new divalent tin catalysts having a very high degree of purity it is possible to use, for the polymerization, relatively impure formaldehyde such as that obtained, for example, in the pyrolysis of paraformaldehyde or a-polyoxymethylene, without intermediate purification, for example by freezing, preliminary polymerization or other measures, and this impure formaldehyde can be converted into high molecular weight polyoxymethylenes having valuable technological properties.

As already indicated, this finding is surprising because when the same catalysts are used but with halogen contents of only 0.5%, alkali contents of only 0.3% and Sn-IV-contents of 15–20% for the polymerization, in a large variety of polymerization media, of formaldehyde vapours obtained by the decomposition of paraformaldehyde only very low molecular weight polyoxymethylenes similar to paraformaldehyde are obtainable. It has been found that particularly divalent tin compounds which contain small proportions of Sn-Cl groups, e.g., in the form of

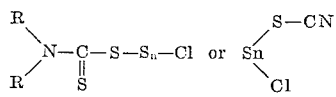

have a very disturbing effect on the polymerization because the chain breaking reagents due to water and other impurities then take place much more rapidly, thereby preventing the formation of high molecular weight polyoxymethylenes.

These catalysts at the same time give increased protection against oxidation reactions and lead to products which have a reduced ash content (often due to $SnO_2$) after acetylation or etherification, whereby the thermostability of the polyoxymethylenes which have been stabilized in their end groups is increased.

To carry out the process according to the invention, it is preferable to work with formaldehyde vapours which contain about 0.5 to 1% water and about 0.3% methanol. A formaldehyde of this degree of impurity can be obtained in a simple manner for example by the pyrolysis of paraformaldehyde having a water content up to 1%, with or without a heat transfer agent. The gases obtained by pyrolysis are then introduced into the polymerization vessel at temperatures of about 90 to 150° C., if desired at reduced or elevated pressure, care being taken to avoid any preliminary polymerization. A good source for the preparation of formaldehyde vapours which contain methanol and have a lower water content are formaldehyde gases obtained in the dehydrogenation of methanol in the absence of hydrogen acceptors. It is sometimes desirable to free such gases from traces of coloured, easily volatile unknown substances by washing them in solvents heated above 90° C. or to remove larger quantities of formic acid by suitable measures, and again any preliminary polymerization is avoided by using sufficiently high temperatures.

In carrying out the polymerization process according to the invention it is important to introduce the formaldehyde gradually into the polymerization medium and to stimulate the polymerization process continuously with fresh catalyst. This increases the yield of high molecular weight polyoxymethylene. 0.000015 to 0.01 mol, preferably 0.0001 to 0.002 mol of catalyst per mol of formaldehyde is generally used if the polymerization is carried out in inert or alkylating solvents. If, on the other hand, the polymerization is carried out in acetic anhydride or some other acylating agent, it is advantageous to use much higher concentrations, namely 0.001 to 0.006 mol of catalyst per mol of formaldehyde. Moreover, when the polymerization is carried out in acetic anhydride it is advantageous to use formaldehyde vapours having a water content of less than 1% because otherwise the free acetic acid formed in the course of polymerization has an increasingly disturbing chain breaking effect.

The catalysts are preferably used in the form of 0.01 to 1% solutions in inert, acylating or alkylating solvents, for example in methylene chloride, 1,2-dichloropropane, carbon tetrachloride, aromatic hydrocarbons such as toluene, ethyl acetate, acetic anhydride, orthoformic acid ethyl ester, formaldehyde dimethylacetal. The catalyst should as far as possible be added evenly over the whole polymerization time. The rate at which the catalyst is added is, of course, variable and depends on the flow velocity at which the formaldehyde is introduced into the polymerization vessel. For example, in the batchwise method it is advantageous to introduce 30 to 70% of the total amount of catalyst at the start and to add the remaining quantity in doses distributed over the whole polymerization time, by means of a dosing pump. It is important to dose the catalyst accurately and continuously because a formaldehyde having, for example, a degree of impurity corresponding to 2.5% water and 0.1 to 0.3% formic acid will introduce impurities into the reaction which are themselves catalytic. This catalytic activity, however, is practically of no importance owing to the many times higher activity of the divalent tin compounds, provided the tin compounds are present in sufficient concentration in the polymerization mixture.

If the polymerization is carried out in inert solvents, then aromatic, araliphatic, cycloaliphatic, and/or aliphatic hydrocarbons and their halogenation products may be used as solvents. However, it is preferable to work in methylene chloride because this is an excellent solvent for the very low molecular weight formaldehyde hydrate formed in the process and because this solvent can be obtained in a very high degree of purity. It is also possible to use solvents such as 1,3-dichloropropane. Carbon tetrachloride and chloroform may also be used for the polymerization provided they are sufficiently free from hydrogen chloride and phosgene.

If the polymerization is carried out in acylating agents, it is preferable to use acetic anhydride, if desired as mixture with other solvents. However, other acylating agents may also be used.

If the polymerization is carried out in alkylating agents, it is preferable to use orthoformic acid ethyl ester as solvent.

The quantity of solvent used may vary within wide limits. It is generally advisable to use about 7 to 12 parts by volume of solvent to 1 part by weight of formaldehyde. The catalyst is generally dissolved in the same solvent as that used for the polymerization.

The polymerization may be carried out at temperatures of −120° to +150° C. It is often advantageous to work at temperatures between −20 and +90° C.

The flow velocity with which the formaldehyde vapours are passed or introduced into the polymerization vessel is variable and depends on the speed of pyrolysis as well as on the temperature conditions in the polymerization vessel.

If the polymerization is carried out in inert solvents, the polymer is separated from the solvent by filtration or centrifuging. The process may be carried out continuously or semi-continuously. Fresh solvent and fresh catalyst may be introduced into the polymerization vessel at a rate corresponding to the removal of polymer.

If the polymerization has been carried out in an acylating solvent, acylating catalysts are added to the polymerization mixture after polymerization is completed, and the mixture is heated to temperatures above 100° C. in order to convert all the end groups and to remove residues of catalyst.

The great advantage of the process according to the invention compared with the polymerization processes hitherto known consists in that formaldehyde having a relatively high water content can be polymerized to high molecular weight polyoxymethylenes, any purification of the formaldehyde vapours by preliminary polymerization and the difficult continuous removal of the preliminary polymer being completely dispensed with. Another important advantage is the fact that the impure formaldehyde used for the polymerization is easily accessible. Further advantages of the process according to the invention lie in the fact that the catalyst residues are more easily removed from the high molecular weight polyoxymethylenes, whereby the thermostability and the colour properties of the polymers are improved, particularly after they have been worked up. Further advantages consist in the improved possibility of chain control and the production of high molecular weight polyoxymethylenes which are more easily worked up.

The high molecular weight polyoxymethylenes prepared by the process according to the invention and stabilized by the methods indicated above may be worked up to high quality synthetic resins, with or without the addition of other substances; such substances are, for example heat stabilizers, antioxidants, plasticisers, fillers, pigment dyestuffs, light protective agents, optical brightening agents and the like.

In the following examples, the parts given for solvents are parts by volume and the other parts are parts by weight.

EXAMPLE 1

140 parts by weight of paraformaldehyde having a water content of 0.65% are decomposed at 124 to 140° C. in an inert heat transfer agent consisting of a hydrocarbon mixture with 12–18 carbon atoms (Mepasin) in a round bottomed flask. The hot formaldehyde vapours pass through a double walled tube of VA steel heated to about 100° C. with steam and through a lid which is also heated with steam and which contains a thermometer, stirrer and outlet tube, into a cylindrical reaction vessel. The reaction vessel has a cross section of about 12 cm. and a capacity of 2000 cc. and is connected to the hot lid through an insulating seal. The outlet of the heated VA tube is about 2 cm. above the liquid level of the polymerization medium. The outlet tube of the heated lid is connected with a Woolf's flask which contains water as covering and receiving liquid and is secured against excess pressure by means of a small ascending tube. The polymerization medium consists of 1400 parts of pure toluene having a water content of 0.02% and contains as catalyst 0.2 part by weight of the following tin compound.

$$[(C_{18}H_{37}-\underset{\underset{CH_3}{|}}{N}-\underset{\underset{S}{\|}}{C}-S-)_2=S_n] \cdot C_{18}H_{37}-\underset{\underset{CH_3}{|}}{N}H$$

A further 0.4 part by weight of the tin compound are dissolved in toluene, and introduced dropwise into the polymerization vessel at a uniform rate over the whole polymerization time. The hot, impure formaldehyde vapours are passed over the surface of the liquid which is stirred at a rate of about 600 revolutions per minute, preliminary polymerization of the formaldehyde being completely suppressed so that its degree of impurity is maintained. Polymerization starts at once and pyrolysis is completed in about 2 hours. Although the formaldehyde vapours are only passed over the surface, the uptake of formaldehyde is excellent, and although the gas outlet tube is open to the Woolf's flask, less than 4% formaldehyde are in the covering fluid at the end of polymerization. The polymerization temperature is maintained at about 25 to 30° C. by cooling with water. At the end of polymerization, the polymerization product is filtered by suction, washed with acetone and dried in vacuo at 40° C. A pure white, high molecular weight polyoxymethylene is obtained in a yield of 110 parts by weight. After acetylation, the product has an internal viscosity of 0.74, measured in 0.5% solution in butyrolactone at 150° C.

*Preparation of the catalyst*

56.6 parts by weight of N-methyl-stearylamine are dissolved in 200 cc. of benzene and 7.6 parts by weight of carbon disulphide are added dropwise with exclusion of air. The N-methyl-stearyl-ammonium salt of N-methyl-stearyl-dithiocarbaminic acid is either isolated or, better still, directly treated with a concentrated solution in benzene of 20 parts by weight of a divalent tin salt of 2-ethyl caproic acid. When the two reaction components are mixed, any crystals of the N-methyl-stearyl-ammonium salt of N-methyl-stearyl-dithiocarbaminic acid that may have precipitated go into solution, forming a deep yellow colour, and renewed crystallisation of the tin-II-dithiocarbaminate sets in after a short time. By slightly heating, the crystal paste diluted with another 100 parts by volume of benzene which contain 28 parts by weight of N-methyl-stearyl-ammonium is dissolved, and the clear solution is added dropwise into 2 litres of methanol, with thorough stirring. A crystalline precipitate of a divalent tin compound is obtained which is found on analysis to be a complex compound of the formula $$[(C_{18}H_{37}-\underset{\underset{CH_3}{|}}{N}-\underset{\underset{S}{\|}}{C}-S-)_2=Sn] \cdot [C_{18}H_{37}-\underset{\underset{CH_3}{|}}{N}-H]$$

It is very easily soluble in benzene, toluene, methylene chloride and much more resistant to oxidation than divalent tin salts of organic carboxylic acids.

EXAMPLE 2

The process is carried out as in Example 1 (same apparatus, same quantity of formaldehyde etc.) but the pyrolysis is carried out at 80° C., and the formaldehyde vapour is introduced without any preliminary polymerization into the polymerization vessel of Example 1 at a partial pressure of 200 mm. nitrogen and 130 mm. formaldehyde. The polymerization medium consists of 1000 parts by volume of toluene and contains as catalyst 0.2 part by weight of colloidal tin sulphide. 0.6 part of the divalent tin sulphide dissolved in benzene and diphenylamine are added at a uniform rate during the polymerization into 100 parts by volume of benzene. After working up the polymerization product according to Example 1, a high molecular weight polyoxymethylene is obtained at a yield of 98 parts by weight. After acetylation, this product has an internal viscosity of 0.95 measured in butyrolactone in 0.5% solution at 150° C.

*Preparation of the polymerization catalyst:* $(Sn=S)_x$ 1.3 parts by weight of tin-II-octoate are treated in 10 parts by weight of diphenylamine and 10 parts by weight of dioxane with an excess quantity of 1.2 parts by weight of water, and the mixture, which becomes turbulent, is thoroughly mixed, with vigorous stirring, with 50 parts by volume of benzene. At the same time, a powerful stream of hydrogen sulphide gas is passed through, and the reaction temperature is maintained at 6 to 8° C. After one hour, insoluble portions are removed by filtration, and the deep yellow solution, which contains about 0.8 part by weight of soluble tin sulphide, is used for the polymerization in Example 2. The colloidal solution is stable for about 4 hours and should be used within this time for the polymerization.

EXAMPLE 3

The process is carried out as in Example 1 but the following divalent tin compounds are used as catalyst:

| | Catalyst | Quantity of Catalyst |
|---|---|---|
| (a) | $\left[\begin{array}{c}R\\ \diagdown\\ NH\\ \diagup\\ R\end{array}\right]_x \cdot Sn \diagup^{NCO}_{NCO}$ or $\left[\begin{array}{c}R\\ \diagdown\\ NH\\ \diagup\\ R\end{array}\right]_x \cdot Sn \diagup^{OCN}_{OCN}$ <br> R=phenyl <br> X=4–10 | 5 parts by weight. |
| (b) | $\left[\begin{array}{c}R\\ \diagdown\\ NH\\ \diagup\\ R\end{array}\right]_x \cdot Sn \diagup^{NCS}_{NCS}$ or $\left[\begin{array}{c}R\\ \diagdown\\ NH\\ \diagup\\ R\end{array}\right]_x \cdot Sn \diagup^{S-C=N}_{S-C=N}$ <br> X=4–10 | 6 parts by weight. |

The polymerization is carried out as in Example 1, and after acetylation, polyoxymethylenes having the following internal viscosities are obtained in the following yields:

| Experiment | Yield | Internal viscosity measured in butyrolactone at 150° C. in 0.5% solution |
|---|---|---|
| (a) | 99 parts by weight | 0.85 |
| (b) | 78 parts by weight | 0.71 |

*Preparation of catalyst (a)*

15 parts by weight of silver cyanate ground to a particle size of $5\mu$ are intensively stirred for 20 hours at room temperature with 20 parts by weight of a divalent tin salt of 2-ethylcaproic acid in a solution of 100 parts by weight of diphenylamine in 500 parts by volume of benzene. Blackish brown reaction products are thereby formed, and these are filtered off. The solution thereby obtained is freed from benzene in a vacuum at 10° C. After some time, diphenylamine crystallises out with small quantities of divalent tin compounds which are mixtures of large quantities of tin-II-$(OCN)_2$ with smaller quantities of tin-II-$(NCO)_2$. The catalysts can only be kept as complexes for a short time and are used as mixtures with diphenylamine.

*Preparation of catalyst (b)*

11.8 parts by weight of freshly prepared divalent tin acetate are kept for 2 hours at 60° C. in 100 parts by weight of diphenylamine and 100 parts by weight of dimethyl formamide with 9.7 parts by weight of thoroughly powdered potassium thiocyanate. 600 parts by weight of benzene are then added. When cold, the reaction mixture is freed from potassium acetate and other insoluble components by filtration, and benzene and dimethylformamide are removed by evaporation in vacuo. When the reaction mixture has been left to stand for some time, diphenylamine together with divalent tin compounds dissolved in it crystallises out. These divalent tin compounds are mixtures of large amounts of Sn-II-$(SNC)_2$ and small amounts of Sn-II-$(NCS)_2$. Owing to the presence of diphenylamine, the otherwise insoluble tin-II-thiocyanate is rendered more easily soluble as a complex and more stable, and together with excess diphenylamine it is used for carrying out the polymerization in Example 3(b).

If, in the method of preparation, tin-II-acetate is replaced by tin-II-chloride, the same catalysts are obtained but before they are used they must be carefully freed from chlorine ions, with the result that the yield is greatly reduced.

EXAMPLE 4

The process is carried out as in Example 1 but the following divalent tin compounds are used as catalyst:

| Experiment | Catalyst | Quantity of Catalyst |
|---|---|---|
| (a) | $(CH_3-(CH_2)_3-CH(C_2H_5)-C(O)-O-)_2=Sn \cdot [NHR_2]_x$ | 2.5 parts by weight. |
| (b) | $(CH_3-C(O)-O)_2=Sn \cdot [NHR_2]_x$ | 3.5 parts by weight. |
| (c) | $(CH_3-C(O)-O)_2=Sn \cdot [HO-CH_2-N(\text{ring: } CH_2-(CH_2)_3, C=O, CH_2)]_x$ | 4 parts by weight. |
| (d) | $(CH_3-C(O)-O)_2=Sn \cdot [HO-CH_2-CH_2-O-C(O)-N(CH_2OH)-(CH_2)_6-N(CH_2OH)-C(O)-O-CH_2-CH_2-OH]_x$ | 6 parts by weight. |
| (e) | $(CH_3-CH_2-C(O)-O)_2=Sn \cdot HOCH-N[\text{triazine ring with } CH_2-OC_4H_9, CH_2OH, CH_2-OC_4H_9-N-CH_2-OC_4H_9]_x$ | 8 parts by weight. |
| (f) | $(C_4H_9-O-CH_2)_2-3-\text{(benzodioxole)}-Sn \cdot [C_4H_8-O-CH_2-NH-C(O)-NH-CH_2OC_4H_9]_x$ | 5 parts by weight. |
| (g) | $(CH_3-(CH_2)_3-CH(C_2H_5)-C(O)-O-)_2=Sn \cdot [CH_2=CH_2, NH, N-CH_2-OC_4H_9, C=O \text{ ring}]_x$ | 3.5 parts by weight. |

$x=4$ to 10; the catalysts are prepared by dissolving the divalent tin salts in the amines or N-methylol derivatives.

The polymerization is carried out as in Example 1, and after acetylation, polymers are obtained with the following internal viscosities and in the following yields:

| Catalyst | Yield | Internal viscosity measured in butyrolactone at 150° C. in 0.5% solution |
|---|---|---|
| (a) | 108 parts by weight | 1.15 |
| (b) | 104 parts by weight | 1.08 |
| (c) | 102 parts by weight | 1.15 |
| (d) | 88 parts by weight | 0.79 |
| (e) | 78 parts by weight | 0.85 |
| (f) | 99 parts by weight | 0.63 |
| (g) | 105 parts by weight | 1.34 |

EXAMPLE 5

The process is carried out as in Example 1. The following divalent tin complexes are used as catalyst:

(a) $Sn(OH)_2$ held in solution by complex formation with about 5 to 10 mols N:N'-dimethylol-tetramethylenediurethane-N,N'-dimethylol-di-n-butyl ether of the formula $C_4H_9-O-CH_2-N(CH_2OH)-\overset{O}{\overset{\|}{C}}-O-(CH_2)_4-O-\overset{O}{\overset{\|}{C}}-N(CH_2OH)-CH_2-O-C_4H_9$, 6 parts by weight (Note: HOH₂C and CH₂OH substituents shown)

(b) Sn=S or $Sn(SH)_2$ rendered soluble by complex formation with about 5 to 10 mols of the caprolactum-monomethylol-n-butylether of the formula $(CH_2)_5-N(\overset{O}{\overset{\|}{C}})-CH_2-O-C_4H_9$, 4 parts by weight After acetylation, the high molecular weight polyoxymethylenes given in the table below are obtained:

| Experiment | Polymerization medium | Yield, parts by weight | Internal viscosity [1] |
|---|---|---|---|
| (a) | Toluene | 104 | 1.05 |
| (a) | Acetic anhydride | 88 | 1.25 |
| (b) | Methylene chloride | 94.5 | 0.82 |

[1] Measured in butyrolactone at 150° C. in 0.5% solution.

Preparation of catalyst (a)

40 parts by weight of tin-II-octoate are dissolved in a mixture of 200 parts by volume of dioxane and 400 parts by weight of N,N'-dimethylol-tetramethylene diurethane-N,N'-dimethylol-n-butyl ether and hydrolysed with 2 parts by volume of water in which the reaction mixture is kept for 3 hours at 60° C. The mixture is diluted with 300 parts by volume of benzene, filtered and then freed from dioxane and benzene in a vacuum at room temperature. A viscous divalent tin complex compound soluble in organic solvents is obtained, which is used as catalyst in experiment (a).

Preparation of catalyst (b)

The process is carried out as described under (a) but water is replaced by hydrogen sulphide which is introduced in large excess into the reaction medium in the course of 3 hours. After the product has been worked up according to (a), a golden yellow catalyst mixture is obtained which is used in the polymerization in experiment (b).

EXAMPLE 6

The process is carried out as in Example 1. The following divalent tin complexes are used as catalyst:

(a) $Sn-(SCN)_2$, rendered soluble by complex formation with 5 to 10 mols monomethylolthiourea-n-butyl ether $H_2N-\overset{S}{\overset{\|}{C}}-NH-CH_2-O-C_4H_9$, 3.5 parts by weight (b) $Sn(CN)_2$ rendered soluble by complex formation with 5 to 10 mols of N-methylol-urea-N'-methylol-n-butyl ether $HOCH_2-NH-\overset{O}{\overset{\|}{C}}-NH-CH_2-O-C_4H_9$ After acetylation, the high molecular weight polyoxymethylenes given in the table below are obtained.

| Experiment | Polymerization medium | Yield, parts by weight | Internal viscosity [1] |
|---|---|---|---|
| (a) | Toluene | 92 | 0.89 |
| (b) | Methylene chloride | 87 | 1.32 |

[1] Measured in butyrolactone at 150° C. in 0.5% solution.

Preparation of catalyst (a)

22.5 parts by weight of $SnCl_2 \cdot 2H_2O$ are dissolved in a small quantity of water and added dropwise into a mixture of 500 parts by volume of benzene and 162 parts by weight of monomethylol-thiourea-n-butyl ether with thorough stirring, the water being at the same time removed azeotropically. Parallel with the addition of tin-II-chloride, a concentrated aqueous solution of 18.4 parts by weight of potassium thiocyanate is added. After the azeotropic removal of water, the insoluble inorganic salts are removed by filtration and benzene is removed at room temperature in a water-jet vacuum. A clear, viscous solution of catalyst is obtained which is used in the polymerization in experiment (a) of this example.

Preparation of catalyst (b)

The process is carried out as described under (a) but potassium thiocyanate is replaced by 13 parts by weight of potassium cyanide, and N-methylolurea-N'-methylol-butyl ether is used as complex-forming compound. After the azeotropic removal of water, $CO_2$ is introduced for one hour into the solution in benzene, and insoluble by-products and inorganic salts are removed by filtration. After removal of the benzene according to (a), a viscous catalyst solution is obtained which is used in the polymerisation in experiment (b) of this example.

We claim:
1. A process for the preparation of high molecular weight polyoxymethylene which comprises polymerizing monomeric gaseous formaldehyde containing 0.5 to 3.0% by weight of water in the presence of a catalytic amount of a compound of the formula:

$$Sn\genfrac{}{}{0pt}{}{R}{R} \cdot \left[ XN\genfrac{}{}{0pt}{}{R_1}{R_2} \right]_x$$

wherein R is selected from the group consisting of an organic carboxylic acid radical containing from 2 up to 8 carbon atoms, a dithiocarbamic acid radical, hydroxyl, a mercapto group, cyanide, thiocyanate and cyanate, X is selected from the group consisting of hydrogen and alkoxy methylene, $R_1$ is selected from the group consisting of alkyl containing from 1 up to 18 carbon atoms, aryl and alkoxy methylene, $R_2$ is selected from the group consisting of alkyl containing from 1 up to 18 carbon atoms, aryl, a carbamide group and a thiocarbamide group and $x$ is a whole number from 1 to 10.

2. The process of claim 1 wherein said polymerizing is carried out in an alkylating agent.

3. The process of claim 1 wherein said polymerizing is carried out in an acylating agent.

4. The process of claim 1 wherein said polymerizing is carried out in the gaseous phase in the presence of a high molecular weight polyoxymethylene, said high molecular weight polyoxymethylene being present in the form of a fluidized bed.

References Cited by the Examiner
UNITED STATES PATENTS

| | | | |
|---|---|---|---|
| 2,848,437 | 8/1958 | Langsdorf et al. | 260—67 |
| 2,989,505 | 5/1961 | Hudgin et al. | 260—67 |
| 3,005,799 | 10/1961 | Wagner | 260—67 |
| 3,161,617 | 12/1964 | Kritzler et al. | 260—67 |
| 3,183,213 | 5/1965 | Van Lohuizen et al. | 260—67 |
| 3,193,532 | 7/1965 | Sidi | 260—67 |
| 3,216,972 | 11/1965 | Sidi | 260—67 |

WILLIAM H. SHORT, *Primary Examiner.*

L. M. MILLER, *Assistant Examiner.*